US007766282B2

(12) United States Patent
Kordel et al.

(10) Patent No.: US 7,766,282 B2
(45) Date of Patent: Aug. 3, 2010

(54) TRAILING EDGE DEVICE CATCHERS AND ASSOCIATED SYSTEMS AND METHODS (75) Inventors: Jan A. Kordel, Sandringham (AU); Seiya Sakurai, Seattle, WA (US); Michael A. Balzer, Kirkland, WA (US); John V. Dovey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 12/001,414

(22) Filed: Dec. 11, 2007

(65) Prior Publication Data

US 2009/0146016 A1 Jun. 11, 2009

(51) Int. Cl.
*B64C 3/50* (2006.01)
(52) U.S. Cl. .................. 244/215; 244/201; 244/213; 244/217; 244/212
(58) Field of Classification Search .................. 244/198, 244/201, 212, 213, 215, 216, 217
See application file for complete search history.

(56) References Cited

U.S. PATENT DOCUMENTS 1,724,456 A    8/1929   Crook (Continued)

FOREIGN PATENT DOCUMENTS

DE            387833      1/1924

(Continued)

OTHER PUBLICATIONS

"Aero-Space Research & Technology," Space Systems, Sep. 1, 2001, pp. 1-28.

(Continued)

*Primary Examiner*—Christopher P Ellis
(74) *Attorney, Agent, or Firm*—Perkins Coie LLP (57) ABSTRACT Trailing edge device catchers and associated systems and methods are disclosed. A system in accordance with one embodiment includes a wing having a wing support, a trailing edge device carried by and movable relative to the wing and having a device support, and a coupling connected between the wing and the trailing edge device. The coupling can include a pivot joint that includes a pivot element aligned along a pivot axis and connected between the wing support and the device support. The coupling can further include an actuator coupled between the wing and the trailing edge device, with the actuator having a first position in which the trailing edge device is stowed, and a second position in which the trailing edge device is deployed, with an air flow gap located between the wing and the trailing edge device when the trailing edge device is in the second position. A cam track is carried by one of the wing and the trailing edge device and has opposing cam track surfaces fixed relative to each other. A cam is carried by the other of the wing and trailing edge device and is positioned within the cam track between the opposing cam track surfaces. The cam is offset from the pivot axis and during normal operation the cam can carry no load or a first load along a load path that includes the cam track, and when a decrease in support provided by at least one of the pivot element, the wing support and the device support occurs, the cam can carry a second non-zero load greater than the first load along the load path.

26 Claims, 9 Drawing Sheets

U.S. PATENT DOCUMENTS

| | | | |
|---|---|---|---|
| 1,770,575 A | 7/1930 | Ksoll | |
| 2,086,085 A | 7/1937 | Lachmann et al. | |
| 2,169,416 A | 8/1939 | Griswold | |
| 2,282,516 A | 5/1942 | Hans et al. | |
| 2,289,704 A | 7/1942 | Grant | |
| 2,319,383 A | 5/1943 | Zap | |
| 2,347,230 A | 4/1944 | Zuck | |
| 2,358,985 A | 9/1944 | McAndrew | |
| 2,378,528 A | 6/1945 | Arsandaux | |
| 2,383,102 A | 8/1945 | Zap | |
| 2,385,351 A | 9/1945 | Davidsen | |
| 2,387,492 A | 10/1945 | Blaylock et al. | |
| 2,389,274 A | 11/1945 | Pearsall et al. | |
| 2,406,475 A | 8/1946 | Rogers | |
| 2,422,296 A | 6/1947 | Flader et al. | |
| 2,444,293 A | 6/1948 | Holt | |
| 2,458,900 A | 1/1949 | Erny | |
| 2,502,315 A | 3/1950 | Earhart | |
| 2,504,684 A | 4/1950 | Harper | |
| 2,518,854 A | 8/1950 | Badenoch | |
| 2,563,453 A | 8/1951 | Briend | |
| 2,652,812 A | 9/1953 | Fenzl | |
| 2,665,084 A | 1/1954 | Feeney et al. | |
| 2,851,229 A | 9/1958 | Clark | |
| 2,864,239 A | 12/1958 | Taylor | |
| 2,877,968 A | 3/1959 | Granan et al. | |
| 2,886,008 A | 5/1959 | Geyer et al. | |
| 2,891,740 A | 6/1959 | Campbell | |
| 2,892,312 A | 6/1959 | Allen et al. | |
| 2,899,152 A | 8/1959 | Weiland | |
| 2,912,190 A | 11/1959 | MacDonough | |
| 2,920,844 A | 1/1960 | Marshall et al. | |
| 2,938,680 A | 5/1960 | Greene et al. | |
| 2,990,144 A | 6/1961 | Hougland | |
| 2,990,145 A | 6/1961 | Hougland | |
| 3,013,748 A | 12/1961 | Westburg | |
| 3,089,666 A | 5/1963 | Quenzler | |
| 3,102,607 A | 9/1963 | Roberts | |
| 3,112,089 A | 11/1963 | Dornier | |
| 3,136,504 A | 6/1964 | Carr | |
| 3,166,271 A | 1/1965 | Zuck | |
| 3,191,147 A | 6/1965 | Majendie | |
| 3,203,275 A | 8/1965 | Hoover | |
| 3,203,647 A | 8/1965 | Alvarez-Calderon | |
| 3,263,946 A | 8/1966 | Roberts et al. | |
| 3,282,535 A | 11/1966 | Steiner | |
| 3,375,998 A | 4/1968 | Alvarez-Calderon | |
| 3,423,858 A | 1/1969 | Speno | |
| 3,447,763 A | 6/1969 | Allcock | |
| 3,463,418 A | 8/1969 | Miksch | |
| 3,504,870 A | 4/1970 | Cole et al. | |
| 3,528,632 A | 9/1970 | Miles et al. | |
| 3,539,133 A | 11/1970 | Robertson | |
| 3,556,439 A | 1/1971 | Autry et al. | |
| 3,583,660 A | 6/1971 | Hurkamp et al. | |
| 3,587,311 A | 6/1971 | Hays, Jr. | |
| 3,589,648 A | 6/1971 | Gorham et al. | |
| 3,594,851 A | 7/1971 | Swatton | |
| 3,642,234 A | 2/1972 | Kamber et al. | |
| 3,653,611 A | 4/1972 | Trupp et al. | |
| 3,659,810 A | 5/1972 | Robertson | |
| 3,677,504 A | 7/1972 | Schwarzler et al. | |
| 3,704,828 A | 12/1972 | Studer et al. | |
| 3,704,843 A | 12/1972 | Jenny | |
| 3,711,039 A | 1/1973 | James | |
| 3,730,459 A | 5/1973 | Zuck | |
| 3,743,219 A | 7/1973 | Gorges et al. | |
| 3,767,140 A | 10/1973 | Johnson | |
| 3,794,276 A | 2/1974 | Maltby et al. | |
| 3,804,267 A | 4/1974 | Cook et al. | |
| 3,807,447 A | 4/1974 | Masuda | |
| 3,813,062 A | 5/1974 | Prather | |
| 3,827,658 A | 8/1974 | Hallworth | |
| 3,831,886 A | 8/1974 | Burdges et al. | |
| 3,836,099 A | 9/1974 | O'Neill et al. | |
| 3,837,601 A | 9/1974 | Cole | |
| 3,853,289 A * | 12/1974 | Nevermann et al. | 244/215 |
| 3,862,730 A | 1/1975 | Heiney | |
| 3,874,617 A | 4/1975 | Johnson | |
| 3,897,029 A | 7/1975 | Calderon et al. | |
| 3,904,152 A | 9/1975 | Hill | |
| 3,910,530 A | 10/1975 | James et al. | |
| 3,913,450 A | 10/1975 | MacGregor | |
| 3,917,192 A | 11/1975 | Alvarez-Calderon et al. | |
| 3,931,374 A | 1/1976 | Moutet nee Layrisse et al. | |
| 3,941,334 A | 3/1976 | Cole | |
| 3,941,341 A | 3/1976 | Brogdon, Jr. | |
| 3,949,957 A | 4/1976 | Portier et al. | |
| 3,968,946 A | 7/1976 | Cole | |
| 3,985,319 A | 10/1976 | Dean et al. | |
| 3,987,983 A | 10/1976 | Cole | |
| 3,991,574 A | 11/1976 | Frazier | |
| 3,992,979 A | 11/1976 | Smith et al. | |
| 3,993,584 A | 11/1976 | Owen et al. | |
| 3,994,451 A | 11/1976 | Cole | |
| 4,011,888 A | 3/1977 | Welchel et al. | |
| 4,015,787 A | 4/1977 | Maieli et al. | |
| 4,106,730 A | 8/1978 | Spitzer et al. | |
| 4,117,996 A | 10/1978 | Sherman | |
| 4,120,470 A | 10/1978 | Whitener | |
| 4,131,253 A | 12/1978 | Zapel | |
| 4,146,200 A | 3/1979 | Borzachillo | |
| 4,171,787 A | 10/1979 | Zapel | |
| 4,180,222 A | 12/1979 | Thornburg | |
| 4,181,275 A | 1/1980 | Moelter et al. | |
| 4,189,120 A | 2/1980 | Wang | |
| 4,189,121 A | 2/1980 | Harper et al. | |
| 4,189,122 A | 2/1980 | Miller | |
| 4,200,253 A | 4/1980 | Rowarth et al. | |
| 4,202,519 A | 5/1980 | Fletcher | |
| 4,240,255 A | 12/1980 | Benilan et al. | |
| 4,247,843 A | 1/1981 | Miller | |
| 4,262,868 A | 4/1981 | Dean | |
| 4,267,990 A | 5/1981 | Staudacher et al. | |
| 4,275,942 A | 6/1981 | Steidl | |
| 4,283,029 A | 8/1981 | Rudolph | |
| 4,285,482 A | 8/1981 | Lewis | |
| 4,293,110 A | 10/1981 | Middleton | |
| 4,312,486 A | 1/1982 | Mc Kinney | |
| 4,325,123 A | 4/1982 | Graham | |
| 4,351,502 A | 9/1982 | Statkus | |
| 4,353,517 A | 10/1982 | Rudolph | |
| 4,358,077 A | 11/1982 | Coronel | |
| 4,360,176 A | 11/1982 | Brown | |
| 4,363,098 A | 12/1982 | Buus et al. | |
| 4,365,774 A | 12/1982 | Coronel | |
| 4,368,937 A | 1/1983 | Palombo et al. | |
| 4,384,693 A | 5/1983 | Pauly | |
| 4,399,970 A | 8/1983 | Evans | |
| 4,427,168 A | 1/1984 | McKinney et al. | |
| 4,441,675 A | 4/1984 | Boehringer | |
| 4,444,368 A | 4/1984 | Andrews | |
| 4,448,375 A | 5/1984 | Herndon | |
| 4,459,084 A | 7/1984 | Clark | |
| 4,461,449 A | 7/1984 | Turner | |
| 4,471,925 A | 9/1984 | Kunz et al. | |
| 4,471,927 A | 9/1984 | Rudolph et al. | |
| 4,472,780 A | 9/1984 | Chenoweth et al. | |
| 4,475,702 A | 10/1984 | Cole | |
| 4,479,620 A | 10/1984 | Rogers et al. | |
| 4,485,992 A | 12/1984 | Rao | |
| 4,496,121 A | 1/1985 | Berlin | |
| 4,498,646 A | 2/1985 | Proksch | |
| 4,528,775 A | 7/1985 | Einarsson et al. | |

| | | | |
|---|---|---|---|
| 4,533,096 A | 8/1985 | Baker |
| 4,542,869 A | 9/1985 | Brine |
| 4,544,117 A | 10/1985 | Schuster et al. |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |
| 4,637,573 A | 1/1987 | Perin |
| 4,650,140 A | 3/1987 | Cole |
| 4,687,162 A | 8/1987 | Johnson et al. |
| 4,691,879 A | 9/1987 | Greene |
| 4,700,911 A | 10/1987 | Zimmer |
| 4,702,441 A | 10/1987 | Wang |
| 4,702,442 A | 10/1987 | Weiland et al. |
| 4,706,913 A | 11/1987 | Cole |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |
| 4,747,375 A | 5/1988 | Williams |
| 4,763,862 A * | 8/1988 | Steinhauer et al. ......... 244/215 |
| 4,779,822 A | 10/1988 | Burandt et al. |
| 4,784,355 A | 11/1988 | Brine |
| 4,786,013 A | 11/1988 | Pohl et al. |
| 4,789,119 A | 12/1988 | Bellego et al. |
| 4,796,192 A | 1/1989 | Lewis |
| 4,808,023 A | 2/1989 | Arnold et al. |
| 4,823,836 A | 4/1989 | Bachmann et al. |
| 4,834,319 A | 5/1989 | Ewy et al. |
| 4,834,326 A * | 5/1989 | Stache ...................... 244/213 |
| 4,838,503 A | 6/1989 | Williams et al. |
| 4,854,528 A | 8/1989 | Hofrichter et al. |
| 4,856,735 A | 8/1989 | Lotz |
| 4,867,394 A | 9/1989 | Patterson, Jr. |
| 4,892,274 A | 1/1990 | Pohl et al. |
| 4,899,284 A | 2/1990 | Lewis et al. |
| 4,962,902 A | 10/1990 | Fortes |
| 4,991,800 A | 2/1991 | Schwarz |
| 5,039,032 A | 8/1991 | Rudolph |
| 5,046,688 A | 9/1991 | Woods |
| 5,050,081 A | 9/1991 | Abbott et al. |
| 5,056,741 A | 10/1991 | Bliesner et al. |
| 5,074,495 A | 12/1991 | Raymond |
| 5,082,207 A | 1/1992 | Tulinius |
| 5,088,665 A | 2/1992 | Vijgen et al. |
| 5,094,411 A | 3/1992 | Rao |
| 5,094,412 A | 3/1992 | Narramore |
| 5,100,082 A | 3/1992 | Archung |
| 5,114,100 A | 5/1992 | Rudolph et al. |
| 5,129,597 A | 7/1992 | Manthey |
| 5,158,252 A | 10/1992 | Sakurai |
| 5,167,383 A | 12/1992 | Nozaki |
| 5,203,619 A | 4/1993 | Welsch |
| 5,207,400 A | 5/1993 | Jennings |
| 5,244,269 A | 9/1993 | Harriehausen |
| 5,259,293 A | 11/1993 | Brunner et al. |
| 5,280,863 A | 1/1994 | Schmittle |
| 5,282,591 A | 2/1994 | Walters et al. |
| 5,310,387 A | 5/1994 | Savagian |
| 5,351,914 A | 10/1994 | Nagao et al. |
| 5,388,788 A | 2/1995 | Rudolph |
| 5,420,582 A | 5/1995 | Kubbat et al. |
| 5,441,218 A | 8/1995 | Mueller |
| 5,474,265 A | 12/1995 | Capbern et al. |
| 5,493,497 A | 2/1996 | Buus |
| 5,535,852 A | 7/1996 | Bishop |
| 5,542,684 A | 8/1996 | Squirrell et al. |
| 5,544,847 A | 8/1996 | Bliesner |
| 5,564,655 A | 10/1996 | Garland et al. |
| 5,600,220 A | 2/1997 | Thoraval et al. |
| 5,609,020 A | 3/1997 | Jackson et al. |
| 5,680,124 A | 10/1997 | Bedell |
| 5,682,537 A | 10/1997 | Davies et al. |
| 5,686,907 A | 11/1997 | Bedell |
| 5,711,496 A | 1/1998 | Nusbaum |
| 5,715,163 A | 2/1998 | Bang |
| 5,735,485 A | 4/1998 | Ciprian et al. |
| 5,740,991 A | 4/1998 | Gleine et al. |
| 5,743,490 A | 4/1998 | Gillingham |
| 5,788,190 A | 8/1998 | Siers |
| 5,839,698 A | 11/1998 | Moppert |
| 5,839,699 A | 11/1998 | Bliesner |
| 5,875,998 A | 3/1999 | Gleine et al. |
| 5,915,653 A | 6/1999 | Koppelman |
| 5,921,506 A | 7/1999 | Appa |
| 5,927,656 A | 7/1999 | Hinkleman |
| 5,934,615 A | 8/1999 | Treichler |
| 5,978,715 A | 11/1999 | Briffe et al. |
| 5,984,230 A | 11/1999 | Orazi |
| 6,015,117 A | 1/2000 | Broadbent et al. |
| 6,033,180 A | 3/2000 | Machida et al. |
| 6,045,204 A | 4/2000 | Frazier |
| 6,057,786 A | 5/2000 | Briffe |
| 6,073,624 A | 6/2000 | Laurent |
| 6,076,767 A | 6/2000 | Farley et al. |
| 6,076,776 A | 6/2000 | Breitbach |
| 6,079,672 A | 6/2000 | Lam et al. |
| 6,082,679 A | 7/2000 | Crouch et al. |
| 6,085,129 A | 7/2000 | Schardt |
| 6,109,567 A | 8/2000 | Saiz et al. |
| 6,112,141 A | 8/2000 | Briffe |
| 6,145,791 A | 11/2000 | Diller et al. |
| 6,152,405 A | 11/2000 | Muller et al. |
| 6,161,801 A | 12/2000 | Kelm et al. |
| 6,164,598 A | 12/2000 | Young et al. |
| 6,173,924 B1 | 1/2001 | Young et al. |
| 6,188,937 B1 | 2/2001 | Sherry |
| 6,189,837 B1 | 2/2001 | Matthews |
| 6,213,433 B1 | 4/2001 | Gruensfelder |
| 6,227,498 B1 | 5/2001 | Arata |
| 6,244,542 B1 | 6/2001 | Young et al. |
| 6,293,497 B1 | 9/2001 | Kelley-Wickemeyer |
| 6,328,265 B1 | 12/2001 | Dizdarevic |
| 6,349,798 B1 | 2/2002 | McKay et al. |
| 6,349,903 B2 | 2/2002 | Caton et al. |
| 6,364,254 B1 | 4/2002 | May et al. |
| 6,375,126 B1 | 4/2002 | Sakurai et al. |
| 6,382,566 B1 | 5/2002 | Ferrel et al. |
| 6,389,333 B1 | 5/2002 | Hansman |
| 6,431,498 B1 | 8/2002 | Watts et al. |
| 6,439,512 B1 | 8/2002 | Hart |
| 6,443,394 B1 | 9/2002 | Weisend |
| 6,450,457 B1 | 9/2002 | Sharp et al. |
| 6,464,175 B2 | 10/2002 | Yada et al. |
| 6,466,141 B1 | 10/2002 | McKay et al. |
| 6,478,541 B1 | 11/2002 | Charles et al. |
| 6,481,667 B1 | 11/2002 | Ho |
| 6,484,969 B2 | 11/2002 | Sprenger |
| 6,499,577 B2 | 12/2002 | Kitamoto et al. |
| 6,536,714 B2 | 3/2003 | Gleine et al. |
| 6,547,183 B2 | 4/2003 | Farnsworth |
| 6,554,229 B1 | 4/2003 | Lam et al. |
| 6,561,463 B1 | 5/2003 | Yount et al. |
| 6,568,189 B2 | 5/2003 | Blot-Carretero et al. |
| 6,591,169 B2 | 7/2003 | Jones et al. |
| 6,598,829 B2 | 7/2003 | Kamstra |
| 6,598,834 B2 | 7/2003 | Nettle et al. |
| 6,601,801 B1 | 8/2003 | Prow et al. |
| 6,622,972 B2 | 9/2003 | Urnes, Sr. et al. |
| 6,622,974 B1 | 9/2003 | Dockter et al. |
| 6,625,982 B2 | 9/2003 | Van Den Bossche et al. |
| 6,644,599 B2 | 11/2003 | Perez |
| 6,651,930 B1 | 11/2003 | Gautier et al. |
| 6,698,523 B2 | 3/2004 | Barber |
| 6,729,583 B2 | 5/2004 | Milliere et al. |

| | | | |
|---|---|---|---|
| 6,745,113 B2 | 6/2004 | Griffin, III et al. | |
| 6,755,375 B2 | 6/2004 | Trikha | |
| 6,796,526 B2 | 9/2004 | Boehringer | |
| 6,796,534 B2 | 9/2004 | Beyer et al. | |
| 6,799,739 B1 | 10/2004 | Jones | |
| 6,802,475 B2 | 10/2004 | Davies et al. | |
| 6,824,099 B1 | 11/2004 | Jones | |
| 6,843,452 B1 | 1/2005 | Vassberg et al. | |
| 6,860,452 B2 | 3/2005 | Bacon et al. | |
| 6,870,490 B2 | 3/2005 | Sherry et al. | |
| 7,226,020 B2 | 7/2005 | Pohl et al. | |
| 6,978,971 B1 | 12/2005 | Dun | |
| 6,981,676 B2 | 1/2006 | Milliere et al. | |
| 7,007,889 B2 | 3/2006 | Charron | |
| 7,007,897 B2 | 3/2006 | Wingett et al. | |
| 7,028,948 B2 | 4/2006 | Pitt | |
| 7,048,228 B2 | 5/2006 | Vassberg et al. | |
| 7,048,234 B2 | 5/2006 | Recksiek et al. | |
| 7,048,235 B2 | 5/2006 | McLean | |
| 7,051,975 B2 | 5/2006 | Pohl et al. | |
| 7,051,982 B1 | 5/2006 | Johnson | |
| 7,059,563 B2 | 6/2006 | Huynh | |
| 7,121,780 B2 | 10/2006 | Matich et al. | |
| 7,147,241 B2 | 12/2006 | Beaujot et al. | |
| 7,159,825 B2 | 1/2007 | Seve | |
| 7,177,731 B2 | 2/2007 | Sandell et al. | |
| 7,188,007 B2 | 3/2007 | Boorman | |
| 7,243,881 B2 | 7/2007 | Sakurai et al. | |
| 7,258,308 B2 | 8/2007 | Beyer et al. | |
| 7,264,206 B2 | 9/2007 | Wheaton et al. | |
| 7,270,305 B2 | 9/2007 | Rampton | |
| 7,300,021 B2 | 11/2007 | Voogt | |
| 7,475,854 B2 * | 1/2009 | Lacy et al. | 244/215 |
| 2002/0046087 A1 | 4/2002 | Hey | |
| 2003/0132860 A1 | 7/2003 | Feyereisen et al. | |
| 2003/0197097 A1 | 10/2003 | Wakayama | |
| 2004/0059474 A1 | 3/2004 | Boorman et al. | |
| 2005/0011994 A1 | 1/2005 | Sakurai et al. | |
| 2005/0017126 A1 | 1/2005 | McLean et al. | |
| 2005/0040294 A1* | 2/2005 | Perez-Sanchez et al. | 244/215 |
| 2005/0045765 A1 | 3/2005 | Pitt | |
| 2005/0061922 A1 | 3/2005 | Milliere | |
| 2005/0109876 A1 | 5/2005 | Jones | |
| 2005/0151028 A1 | 7/2005 | Pohl et al. | |
| 2005/0171652 A1 | 8/2005 | Speer | |
| 2005/0178903 A1 | 8/2005 | Boorman et al. | |
| 2005/0192717 A1 | 9/2005 | Tafs et al. | |
| 2005/0222721 A1 | 10/2005 | Chen et al. | |
| 2005/0224662 A1 | 10/2005 | Lacy et al. | |
| 2005/0228674 A1 | 10/2005 | Gunn et al. | |
| 2005/0230565 A1 | 10/2005 | Kallinen | |
| 2005/0231390 A1 | 10/2005 | Crane et al. | |
| 2005/0242234 A1 | 11/2005 | Mahmulyin | |
| 2005/0242243 A1 | 11/2005 | Seve | |
| 2005/0274847 A1 | 12/2005 | Charron | |
| 2006/0000952 A1 | 1/2006 | Rampton et al. | |
| 2006/0038086 A1 | 2/2006 | Reckzeh | |
| 2006/0049308 A1 | 3/2006 | Good et al. | |
| 2006/0102803 A1 | 5/2006 | Wheaton et al. | |
| 2006/0175468 A1 | 8/2006 | Huynh | |
| 2006/0226297 A1 | 10/2006 | Perez-Sanchez | |
| 2006/0245882 A1 | 11/2006 | Khan et al. | |
| 2007/0034748 A1 | 2/2007 | Sakurai et al. | |
| 2007/0114328 A1 | 5/2007 | Lacy et al. | |
| 2007/0114329 A1 | 5/2007 | Lacy et al. | |
| 2007/0176051 A1 | 8/2007 | Good et al. | |
| 2007/0252040 A1 | 11/2007 | Kordel et al. | |
| 2008/0283672 A1 | 11/2008 | Denzler et al. | |

FOREIGN PATENT DOCUMENTS

| | | | |
|---|---|---|---|
| DE | 1129379 | 5/1962 | |
| EP | 0 103 038 | 3/1984 | |
| EP | 0205939 A2 | 12/1986 | |
| EP | 0 215 211 | 3/1987 | |
| EP | 230061 A1 * | 7/1987 | 244/215 |
| EP | 0 286 120 | 10/1988 | |
| EP | 0 483 504 A1 | 5/1992 | |
| EP | 0 489 521 | 6/1992 | |
| EP | 0781704 A1 | 2/1997 | |
| EP | 0 947 421 | 10/1999 | |
| EP | 1010616 | 6/2000 | |
| EP | 1338506 | 8/2003 | |
| EP | 1 462 361 | 9/2004 | |
| EP | 1 547 917 A1 | 6/2005 | |
| FR | 705155 | 6/1931 | |
| FR | 984443 | 7/1951 | |
| FR | 56121 | 9/1952 | |
| FR | 57988 | 9/1953 | |
| FR | 58273 | 11/1953 | |
| GB | 1181991 A | 2/1970 | |
| GB | 2144688 | 3/1985 | |
| WO | WO-9105699 A1 | 5/1991 | |

OTHER PUBLICATIONS

"Flap (aircraft)", Wikipedia, The Free Encyclopedia, Aug. 3, 2006, 10:18 UTC. Wikimedia Foundation, Inc. Aug. 5, 2006; 2 pages, http://wn.wikipedia.org/index.pho?title=Flap_%28aircraft%29&oldid=67413665>.

"Slats.", Wikipedia, The Free Encyclopedia. Jun. 27, 2006, 12:323 UTC. Wikimedia Foundation, Inc. Aug. 5, 2006; 2 pp., http://wn.wikipedia.org/w/index.php?title=Slats&oldid=60827639>.

777 Maintenance Manual, High Lift System Publication Date: Circa 1994 (1 page).

777 Maintenance Manual - Spoiler and Speedbrake Control - Inboard and Outboard Spoiler PCU - Functional Description, Sep. 5, 2002, p. 39.

777 Maintenance Manual, Flap Drive System, Publication Date: Circa 1994 (1 page).

777 Maintenance Manual, Flap Transmission and Support, Publication Date: Circa 1994 1 pg.

777 Maintenance Manual, Transmission - Typical, Publication Date: Circa 1994 (1 page).

A320 Hinterkantem-Klappen-Verstell System, Trailing Edge Flap System, SAE Presentation, Publication Date: Circa 1990 (1 page).

A340 Flight Controls, SAE Presentation, Publication Date: Circa 1995 (1 page).

Component Maintenance Manual, MOOG, Inc. May 1994 (2 pages).

Leaf Spring Retainer Seals; EMP, Inc.; 2 pgs; emp.com; accessed Apr. 27, 2005.

Becker, J., "The High Speed Frontier, Chapter 2: The High-Speed Airfoil Program, "Supercritical" Airfoils," 1957-1978 , accessed Aug. 7, 2003, 4 pages; http://www.hq.nasa.gov/office/pao/History/SP-445/ch2-5.

Black, J., "Adaptive Aircraft: No Flight of Fancy?" Research into using exotic means of making wings change shpe in-flight looks promising, though still a long way from reality, Business Week Online, Jan. 7, 2003, pp. 1-2.

Dijksman, E.A. "Six-Bar Cognates of a Stephenson Mechanism," Jnl Mechanisms, vol. 6, pp. 31-57, Pergamon Press 1971.

Drela, M., "Optimization Techniques in Airfoil Design," MIT Aero & Astro, 30 pages; [date unknown].

Drela, Mark, "Design and Optimization Method for Multi-Element Airfoils," MIT Department of Aeronautics and Astronautics, Copyright 1993 American Institute of Aeronautics and Astronautics, Inc. pp. 1-11.

Hansen, H., "Application of Mini-Trailing-Edge Devices in the Aviator Project," Airbus Deutschland, EGAG, Hunefeldstr. 1-5, D-28199 Bremen, Germany, 19 pages; Jan. 7, 2003.

International Search Report and Written Opinion, International Patent Application No. PCT/US2008/082146, Applicant: The Boeing Company, mailed Feb. 15, 2010, 14 pages.

Junkers JU 52/3M (2 pages); http://www.wpafb.atmil/museum/outdoor/od16; accessed Aug. 7, 2003.

Morphing Aircraft Structures, "Morphing Aircraft Structures-Raytheon," <<http://www.defense-update.com/products/m/morphinq-structures.htm>>, 3 pages, accessed Aug. 13, 2005.

Morphing Aircraft Structures, "Morphing Aircraft Structures-The Cellular Approach," <http://www.personal.psu.edu/users/d/s/dsr134/mas/Cellular.htm>, Penn State University, pages 1-3, accessed Aug. 13, 2005.

Morphing Systems, "Morphing Aerostructures-An Overview," www.crgrp.net/morphingsystems.htm <http://www.crgrp.net/morphingsystems.htm>, 7 pages, accessed Aug. 13, 2005.

Niu, Chen-Yen, Airframe Structural Design, Chen-Yeun Niu, Conmilit Press, 1988 (1 page).

Olson, Daniel G., "What is a Watt I Linkage?"; http://www.mines.edu/fs_home/dgolson/WattOneB.html; [accessed Jul. 31, 2008]; 1 pg.

Petrov, A.V., "Certain Types of Separated Flow over Slotted Wings," Fluid Mechanics - Soviet Research, vol. 7, No. 5, pp. 80-89, Sep.-Oct. 1978.

Rea, Jon, "Boeing 777 High Lift Control System," Boeing Commercial Airplane Group, IEEE AES Systems Magazine, Aug. 1993, pp. 15-21.

Slocum, Alexander "FUNdaMENTALS of Desgin," copyright 2008, accessed Jan. 1, 2008, 62 pgs.

TU-144 Canard, 1 pg, (date unknown).

Whitcomb, Richard T., "Review of NASA Supercritical Airfoils," National Aeornautics and Space Administration, Aug. 1974, pp. 8-18.

* cited by examiner

TRAILING EDGE DEVICE CATCHERS AND ASSOCIATED SYSTEMS AND METHODS

TECHNICAL FIELD

The present disclosure is directed generally toward trailing edge device catchers and associated systems and methods.

BACKGROUND

Deployable leading and trailing edge devices have been used for many years to control the attitude and lift/drag characteristics of modern aircraft. In particular, conventional trailing edge ailerons located on left and right aircraft wings are deployed asymmetrically to roll the aircraft. Trailing edge flaps are generally deployed symmetrically to create high lift wing configurations suitable for landing and take-off. The flaps are then stowed for more efficient operation at cruise conditions.

Conventional trailing edge devices typically include flaps, ailerons, or flaperons that are hinged relative to the wing, and are driven between the stowed and deployed positions by one or more actuators. Such devices are typically supported with multiple pins arranged along a hinge axis. Each pin can be supported by a bracket pair consisting of a wing bracket carried by the wing, and a trailing edge device bracket carried by the trailing edge device. Multiple (e.g., three or more) bracket pairs and corresponding pins provide for system redundancy, so that if one bracket or pin fails, the remaining brackets and pins can support the trailing edge device relative to the wing.

The foregoing approach for providing redundant support systems for a trailing edge device is typically used when the trailing edge device has a relatively large spanwise dimension, as is the case for some existing aircraft wings. For smaller devices, space constraints have resulted in alternate design approaches. In such cases, the spanwise dimension may be too small to readily accommodate more than two pairs of wing/trailing edge device brackets and associated pins. Accordingly, such trailing edge devices may be outfitted with a "catcher" or other arrangement that prevents the trailing edge device from separating from the wing in the event that one of the brackets or pins fails. Catchers have been installed on existing aircraft.

Figure 1A:
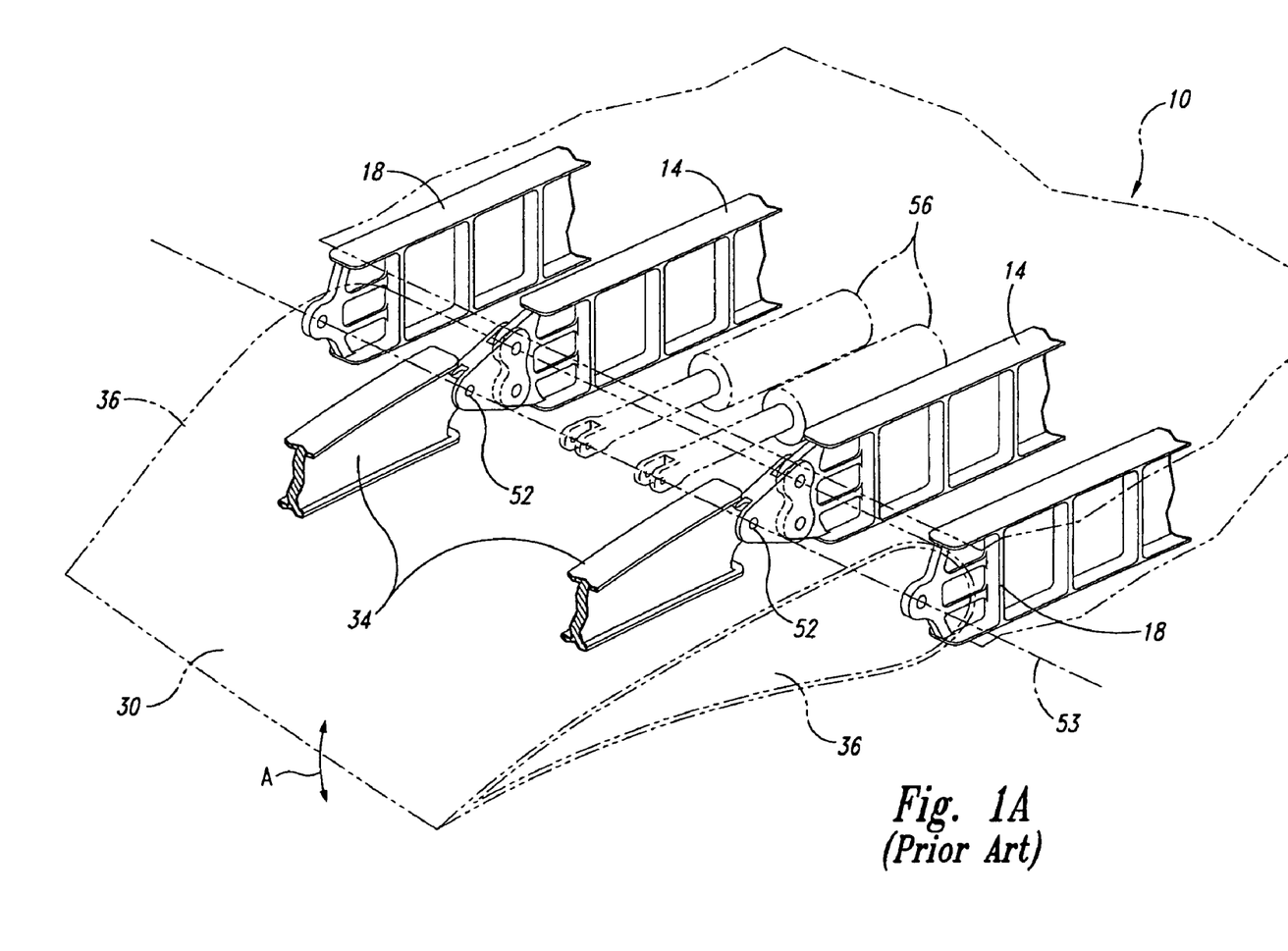
FIGS. 1A-1C schematically illustrate a trailing edge device catcher arrangement in accordance with the prior art.
Figure 1B:
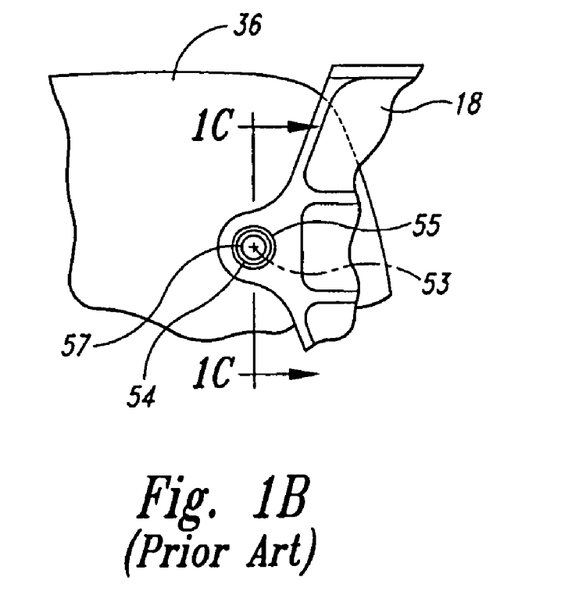
Figure 1C:
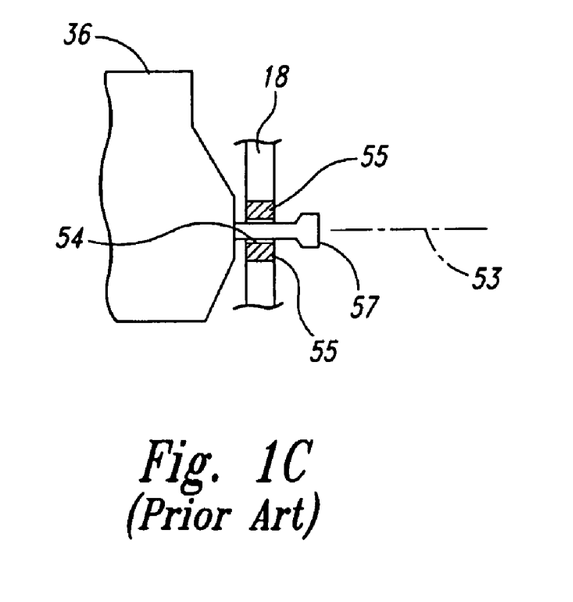

FIGS. 1A-1C schematically illustrate an existing catcher device. Beginning with FIG. 1A, an aircraft wing 10 can include a trailing edge device 30 (e.g., an aileron) that is supported relative to the wing 10 for rotation about a pivot axis 53. The wing 10 can include two spaced-apart wing supports 14 that align with two corresponding aileron supports 34. Pins 52 are connected between the wing supports 14 and the aileron supports 34, and actuators 56 deploy and stow the aileron 30, as indicated by arrows A. The aileron 30 can also include inboard and outboard edge panels 36, and each edge panel 36 can be positioned proximate to a catcher support 18 carried by the wing 10.

FIG. 1B illustrates a detail of one of the edge panels 36 and the corresponding catcher support 18. The catcher support 18 carries a catcher 55 having an opening 54. The edge panel 36 includes a stub 57 that extends along the pivot axis 53 and is received in the opening 54 of the catcher 55. FIG. 1C illustrates an end view of the edge panel 36 and catcher support 18 shown in FIG. 1B, and illustrates the stub 57 received in the catcher opening 54. During normal operation, the stub 57 does not contact the catcher 55. If one of the pins 52, wing supports 14, or aileron supports 34 (FIG. 1A) fails, the stub 57 shifts and is "caught" by the catcher 55, thereby preventing the aileron 34 from separating from the wing 10.

While the foregoing arrangements for providing redundant support for the aileron 30 have proven suitable, aircraft manufacturers are under continuing pressure to reduce the weight and improve the efficiency of such devices. Accordingly, there remains an unmet need in this technology.

SUMMARY

Aspects of the present disclosure are directed generally to trailing edge device catchers and associated systems and methods. A system in accordance with a particular embodiment includes a wing having a wing support, and a trailing edge device carried by and moveable relative to the wing and having a device support. A coupling is connected between the wing and the trailing edge device. The coupling can include a pivot joint that in turn includes a pivot element aligned along a pivot axis and connected between the wing support and the device support, and an actuator coupled between the wing and the trailing edge device. The actuator has a first position in which the trailing edge device is stowed, and a second position in which the trailing edge device is deployed. An airflow gap is located between the wing and the trailing edge device when the trailing edge device is in the second position. The coupling can further include a cam track carried by one of the wing and the trailing edge device, and a cam carried by the other of the wing and the trailing edge device. The cam track can have opposing cam track surfaces fixed relative to each other, with the cam positioned within the cam track between the opposing cam track surfaces and offset from the pivot axis. During normal operation, the cam carries no load or a first load along a load path that includes the cam track. When a decrease in support provided by at least one of the pivot element, the wing support, and the device support occurs, the cam carries a second, non-zero load greater than the first load along the load path.

In a further particular embodiment, the system further includes a hinge panel carried by the wing and movable relative to the wing to control the size of the airflow gap. In an aspect of this embodiment, the cam track is the third of at least three cam tracks, the cam is a third cam, and the system further includes first and second generally parallel, laterally offset cam tracks carried by the wing, and corresponding first and second cams carried by the trailing edge device. Each one of the first and second cams is engaged with a corresponding one of the first and second cam tracks and the third cam track is discontinuous with both the first and second cam tracks. First and second hinge panel links are coupled between the hinge panel and a corresponding one of the first and second cams.

Other embodiments are directed to methods for operating an aircraft system. One such method includes movably supporting a trailing edge device relative to a wing with a coupling that includes a wing support, a device support, and a pivot element pivotably coupled between the wing support and the device support. The wing can have one of a cam track and a cam, and the trailing edge can have the other of the cam track and the cam, with the cam track having opposing fixed cam track surfaces, and with the cam positioned between the cam track surfaces. The method further includes pivoting the trailing edge device about the pivot element (during normal operation) while the cam carries no load or a first load along a load path that includes the cam track. The method still further includes supporting the trailing edge device relative to the wing (if support provided by the coupling decreases) while the cam carries a second non-zero load greater than the first load along the load path.

DETAILED DESCRIPTION

Aspects of the present disclosure are directed generally to redundant support arrangements for aircraft trailing edge devices (e.g., "catchers") and associated systems and methods. Several details describing structures or processes that are well-known and often associated with such systems and methods are not set forth in the following description for purposes of brevity. Moreover, although the following disclosure sets forth several representative embodiments of trailing edge device systems and methods, several other embodiments can have different configurations and/or different components than those described in this section. Accordingly, such embodiments may include additional elements and/or may eliminate one or more of the elements described below with reference to FIGS. 2A-7.

Figure 2A:
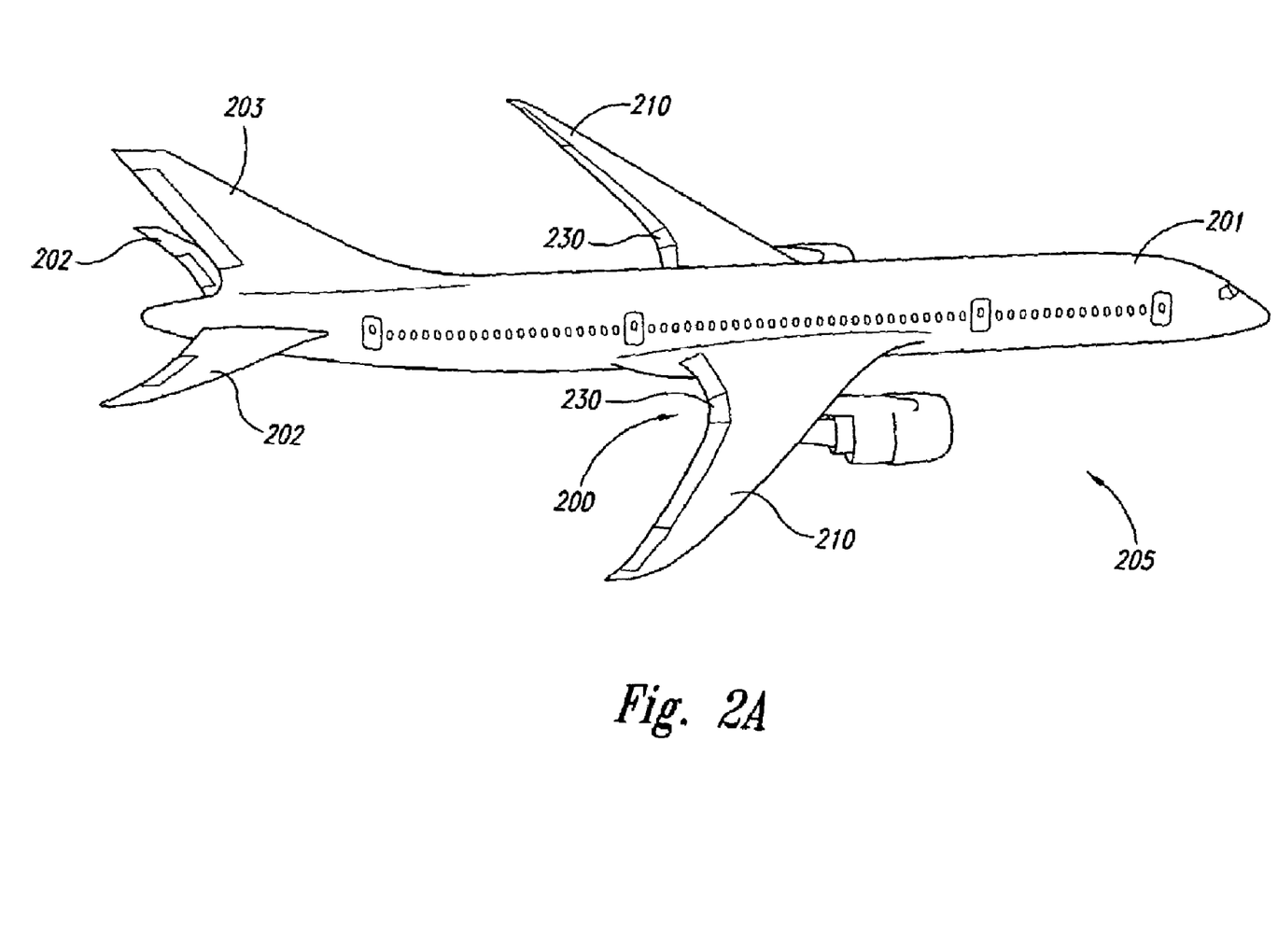
FIG. 2A is an isometric, partially schematic illustration of an aircraft having a system that includes a trailing edge device capture arrangement in accordance with an embodiment of the disclosure.

FIG. 2A is an isometric illustration of an aircraft 205 that includes a fuselage 201, wings 210, horizontal stabilizers 202, and a vertical stabilizer 203. The aircraft 205 can also include multiple trailing edge devices 230 that, together with the wings 210, can form a system 200 that supports the trailing edge devices 230 for deployment relative to the wing 210, and that provides for redundancy in the event that the support provided by one or more components of the system decreases during operation.

Figure 2B:
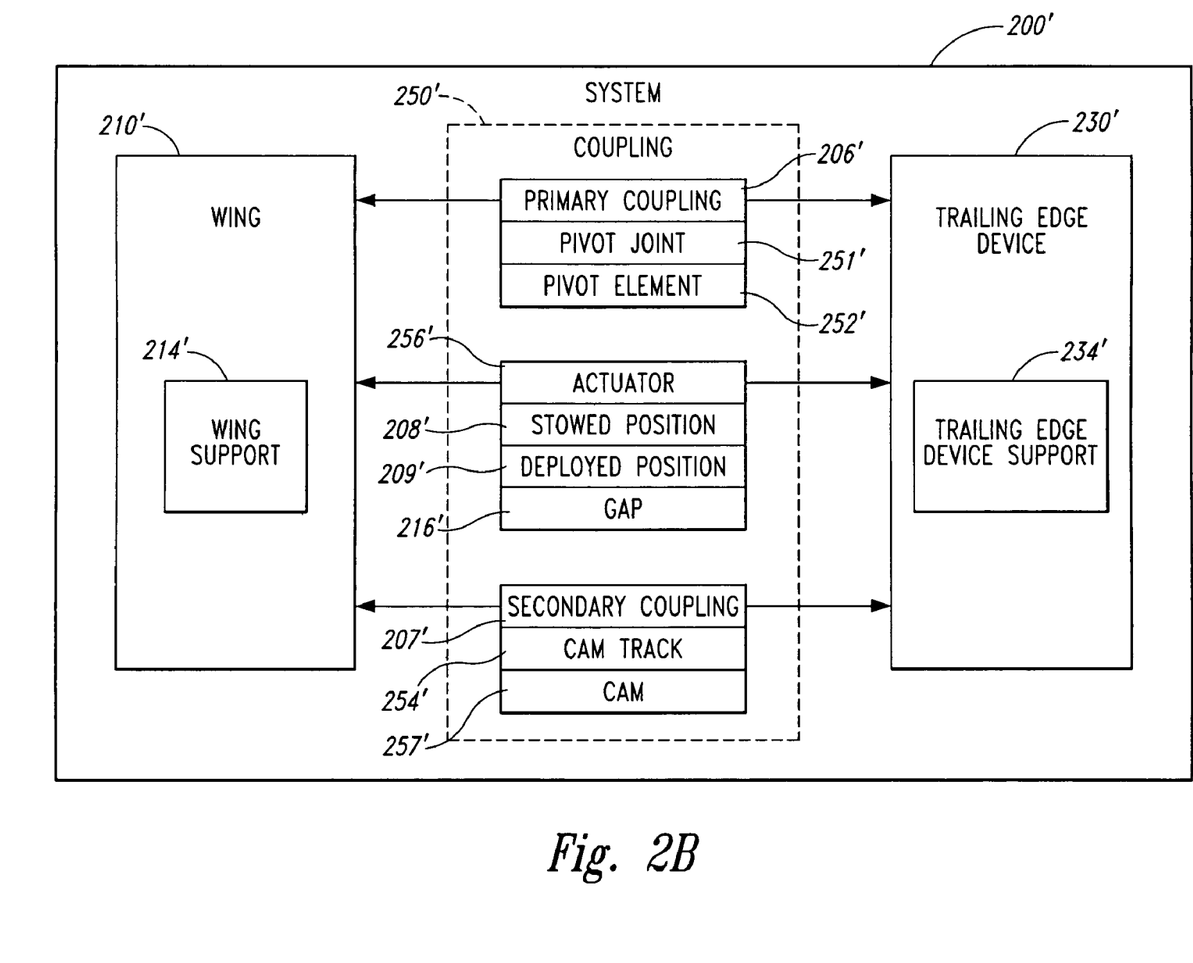
FIG. 2B is a functional block diagram illustrating representative components in accordance with an embodiment of the disclosure.

FIG. 2B is a functional block diagram illustrating a representative system 200', including a wing 210' and a trailing edge device 230'. The wing 210' can include a wing support 214' and the trailing edge device 230' can include a trailing edge device support 234'. A coupling 250' can be connected between the wing 210' and the trailing edge device 230'. The coupling 250' can include a primary coupling 206' having a pivot joint 251' that in turn includes a pivot element 252'. The coupling 250' can further include a secondary coupling 207' that in turn includes a cam track 254' carried by one of the wing 210' and the trailing edge device 230', and a cam 257' carried by the other of the wing 210' and the trailing edge device 230'. The secondary coupling 207' can provide redundancy relative to the primary coupling 206'. An actuator 256' is also coupled between the wing 210' and the trailing edge device 230' to move the trailing edge device 230' between a stowed position 208' and one or more deployed positions 209'. An airflow gap 216' can be located between the trailing edge device 230' and the wing 210' in one or more of the deployed positions 209'.

Figure 3:
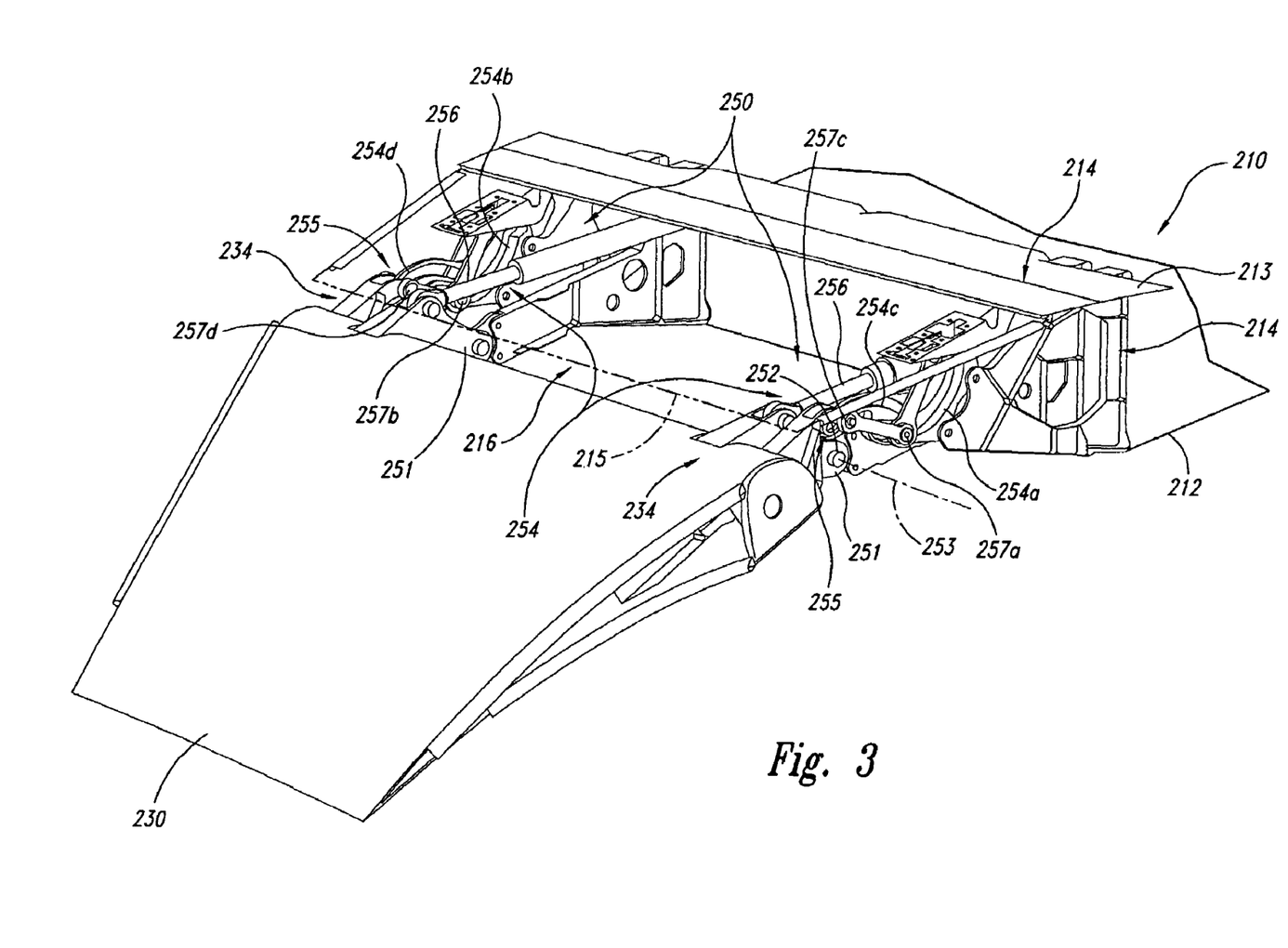
FIG. 3 is an isometric, partially schematic illustration of a trailing edge device carried by a wing via couplings configured in accordance with an embodiment of the disclosure.

FIG. 3 is a rear isometric illustration of one of the trailing edge devices 230 shown in FIG. 2, along with a portion of the corresponding wing 210. For purposes of illustration, the trailing edge device 230 shown in FIG. 3 is illustrated as a generally trapezoidal-shaped flaperon. The general principles in accordance with which the trailing edge device 230 is secured for movement relative to the wing 210 may be applied to other types of trailing edge devices as well.

The wing 210 includes multiple wing supports 214 (two are shown in FIG. 3) positioned between an upper surface 213 and a lower surface 212. The trailing edge device 230 includes multiple device supports 234 (two are shown in FIG. 3) that are secured relative to the wing supports 214 via a corresponding coupling 250. The coupling 250 can include, in addition to the wing supports 214 and the device supports 234, multiple pivot joints 251 between the device supports 234 and the wing supports 214 that allow the trailing edge device 230 to rotate relative to the wing 210 about a pivot axis 253. The pivot joint 251 can include a pin or other pivot element 252. The coupling 250 formed between the trailing edge device 230 and the wing 210 can further include one or more actuators 256 (two are shown in FIG. 3) that rotatably deploy and retract the trailing edge device 230 about the pivot axis 253. The pivot joints 251 in combination with the wing supports 214 and the device supports 234 can form the primary coupling 206' shown in FIG. 2B.

The pivot axis 253 is positioned so that as the trailing edge device 230 deploys, it opens a gap 216 relative to the wing 210. For example, the pivot axis 253 can be positioned below and outside the general contour of the wing 230. In a particular embodiment, the system 200 can further include a hinge panel (e.g., a rigid hinge panel) 215 that moves in concert with the trailing edge device 230 to control the size of the gap 216. Accordingly, the coupling 250 between the wing 210 and the trailing edge device 230 can include one or more cam tracks 254. The cam tracks 254 can provide a "programming" function to control the motion of one system component relative to another, and/or a "catcher" function to prevent separation of one or more components. For example, FIG. 3 illustrates a first cam track 254a and a second cam track 254b that are carried by the wing 210 and that control the motion of the hinge panel 215. The system 200 can further include one or more additional cam tracks (shown as a third cam track 254c and a fourth cam track 254d) that are carried by the wing 210 and that receive a corresponding cam carried by the trailing edge device 230. Corresponding cams 257a-d are received in the cam tracks 254a-d. If a decrease in support occurs at the pivot axis 253, the wing support 214 and/or the device support 234, the third and fourth cam tracks 254c, 254d act as "catchers" 255 to prevent the trailing edge device 230 from separating from the wing 210. Accordingly, the catchers 255 can function as the secondary coupling 207' shown in FIG. 2B. Further details of this arrangement are described below.

Figure 4:
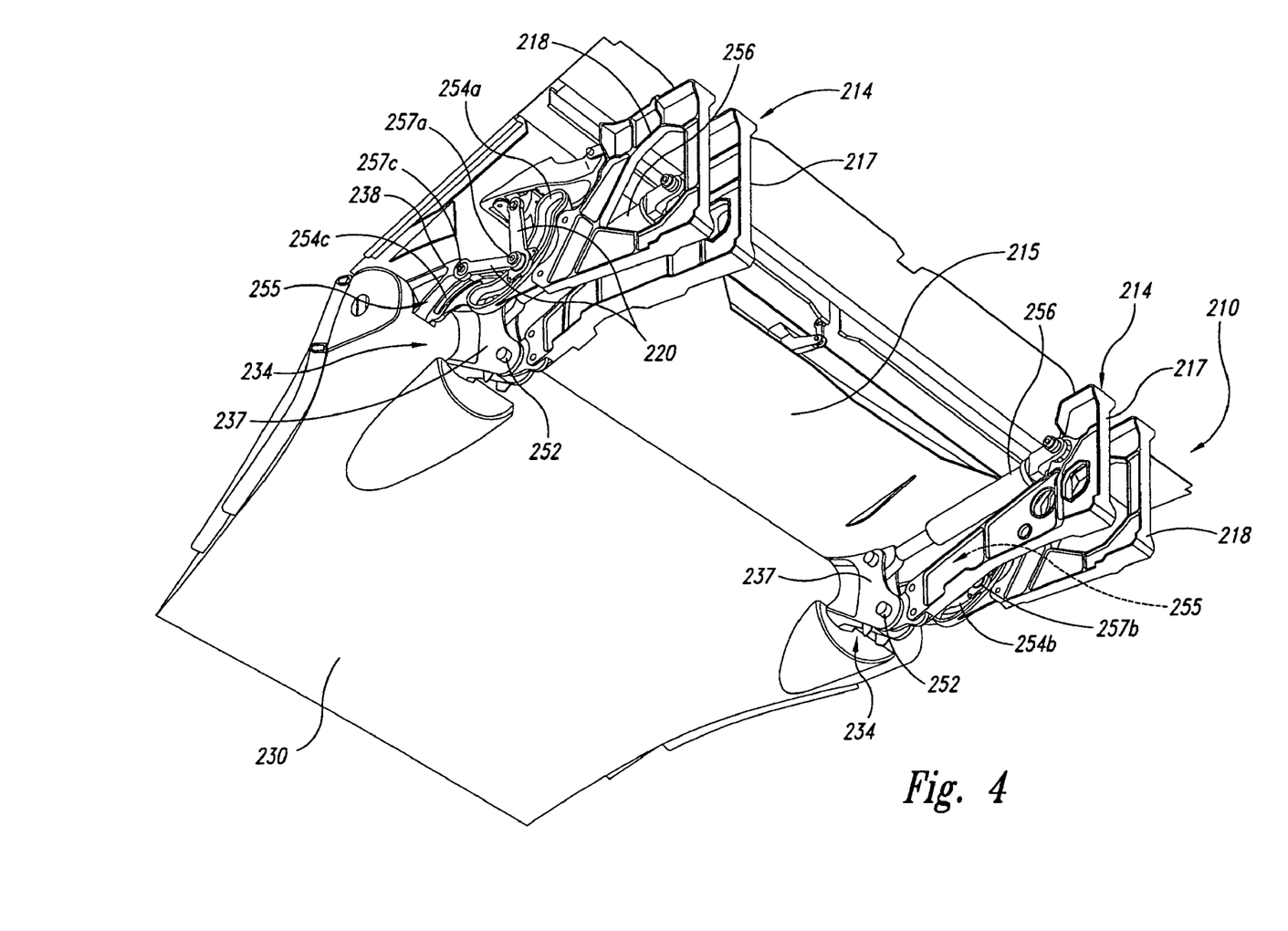
FIG. 4 is a partially schematic bottom isometric illustration of the arrangement shown in FIG. 3.

FIG. 4 is an isometric view looking up from below toward the trailing edge device 230 and the aft portion of the wing 210. In the particular embodiment shown in FIG. 4, each of the wing supports 214 can include two brackets: a wing pivot bracket 217 and a wing cam bracket 218. Each device support 234 can also include two brackets: a device pivot bracket 237 and a device cam bracket 238. The wing pivot brackets 217 are connected to corresponding device pivot brackets 237 with the pivot elements 252. The actuators 256 can also be connected between the wing pivot brackets 217 and the corresponding device pivot brackets 237 to deploy and stow the trailing edge device 230.

In the illustrated embodiment, one of the wing cam brackets 218 carries the first and third cam tracks 254a, 254c, and the other carries the second cam track 254b and the fourth cam track 254d (not visible in FIG. 4). The first cam track 254a receives a first cam 257a that, together with hinge panel links 220, drive the hinge panel 215 as the trailing edge device 230 is deployed. The third cam track 254c (which can operate as a catcher 255) receives a third cam 257c that can support the trailing edge device 230 relative to the wing 210 in the unlikely event that one or more of the other components of the coupling 250 (FIG. 3), the wing support 214, or the device support 234 provides a reduced level of support. In a generally similar manner, the second cam track 254b receives a second cam 257b for guiding the hinge panel, and the fourth cam track 254d and cam 257d (not visible in FIG. 4) operate as an additional catcher 255. Aspects of this mode of operation are described further below with reference to FIGS. 5 and 6.

Figure 5:
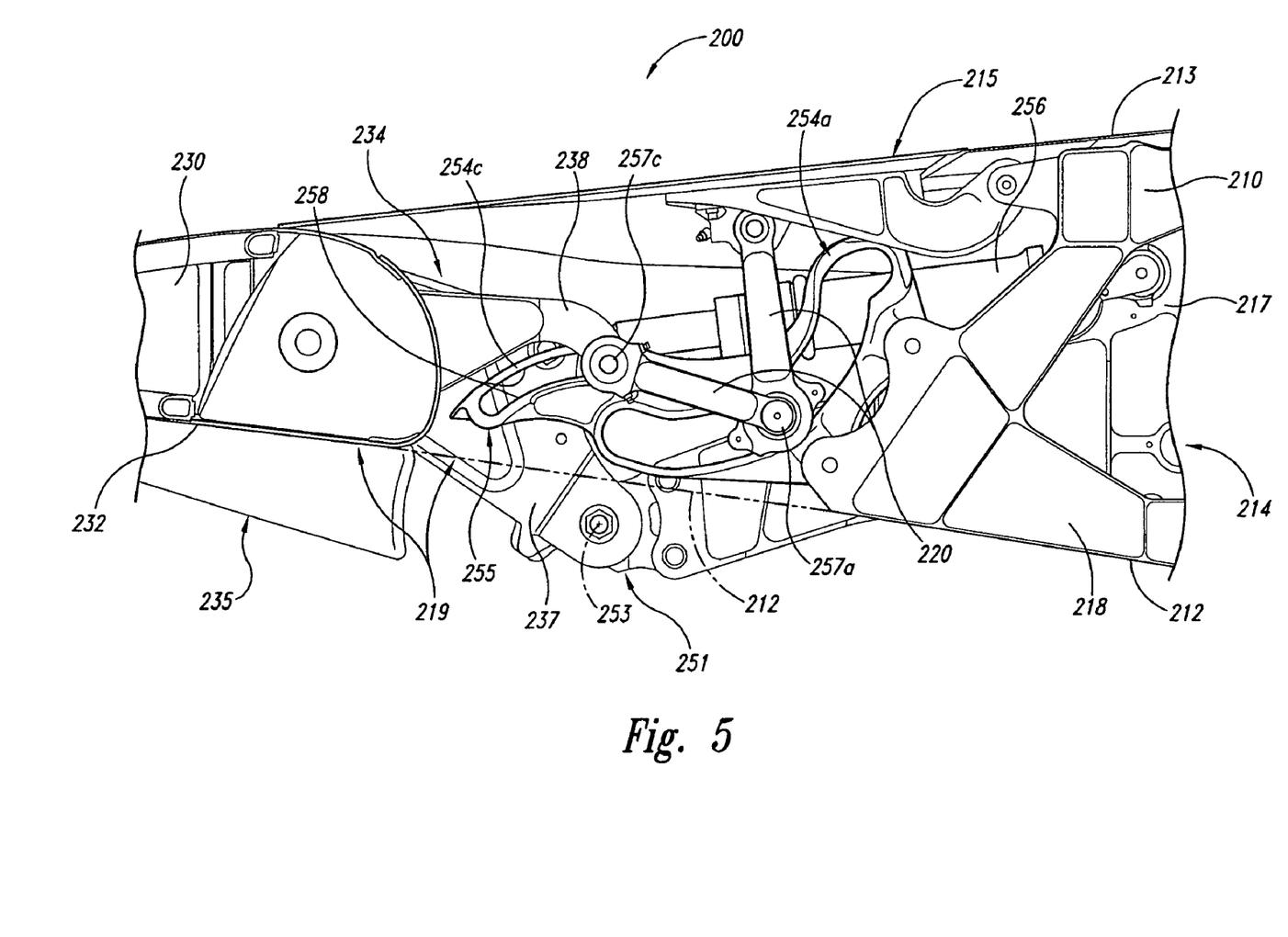
FIG. 5 is a partially schematic cross-sectional illustration of the arrangement shown in FIGS. 3 and 4, with the trailing edge device in a stowed position.

FIG. 5 is a side elevation view of an embodiment of the system 200 shown in FIGS. 2A-4, illustrating the third cam track 254c and the corresponding third cam 257c. The following discussion applies as well to the fourth cam track 254d (FIG. 3) and the corresponding fourth cam (not visible in FIG. 5). The trailing edge device 230 is shown in FIG. 5 in a stowed position relative to the wing 210. In this position, the wing lower surface 212 and the device lower surface 232 can form a generally smooth composite external contour 219, with the pivot joint 251 positioned below or outside the composite external contour 219. A fairing 235 (a portion of which is shown in FIG. 5) aerodynamically shields the pivot joint 251 and the portions of the wing support 214 and the device support 234 that extend outside the composite external contour 219.

The third cam track 254c can have a generally arcuate shape, forming a portion of a circular arc around the pivot axis 253. Accordingly, when the trailing edge device 230 rotates about the pivot joint 251, the third cam 257c (carried by the device cam bracket 238) moves along an arcuate path within the third cam track 254c. Accordingly, in a particular embodiment, the third cam track 254c can include opposing cam track surfaces 258 that are fixed relative to each other and within which the third cam 257c is received.

In a particular embodiment, the third cam 257c does not contact either of the opposing cam track surfaces 258 during normal operation. For example, the third cam 257c can have a maximum extent within the third cam track 254c that is less then the distance between the opposing cam track surfaces 258. In another embodiment, the third cam 257c may have incidental contact with one or the other cam track surface 258, but will not contact both cam track surfaces 258 simultaneously so as to prevent binding. The third cam 257c can include a roller so that if it does engage one of the cam track surfaces 258, it rolls along that surface. In other embodiments, the third cam 257c can be fixed, e.g., the third cam 257c can include a fixed, cylindrical-shaped element that slides rather than rolls along the cam track surfaces 258. In general, the third cam 257c may include a roller when incidental contact with the cam track surfaces 258 is more likely, and can include a fixed device when such contact is less likely. In either embodiment, however, the third cam 257c may have little or no contact with the cam track surfaces 258 during normal operation to avoid wearing and/or excessively loading the cam track surfaces 258. One of the hinge panel links 220 can be pivotably connected to the trailing edge device 230 at or near the third cam 257c, as show in FIG. 5. In other embodiments, the hinge panel links 220 can be coupled elsewhere, or, if the hinge panel 215 is not present, eliminated.

In the unlikely event that a decrease occurs in the support provided by the pivot joint 251, the wing support 214, and/or the device support 234, the trailing edge device 230 may shift slightly relative to the wing 210, causing the third cam 257c to come into contact with one or the other of the cam track surfaces 258. Accordingly, the third cam track 254c can support the trailing edge device 230 despite the decrease in support provided by one or more other components of the coupling 250. In one aspect of this embodiment, the actuator 256 can have a fixed length when such a decrease occurs, and the third cam 257c (now engaged with one of the cam track surfaces 258) can prevent the trailing edge device 230 from moving relative to the wing 210. In another embodiment, the actuator 256 can be operated despite the decrease in support, driving the trailing edge device 230 relative to the wing 210 under the guidance provided by the third cam 257c as it moves along the third cam track 254c. In any of these embodiments, the decrease in support provided by one or more components of the coupling 250 can include an actual breakage or fracture of the component, as well as other degradations of the component that significantly reduce its load-carrying capability.

In a particular embodiment, the third cam track 254c and the first cam track 254a can be formed from a unitary structure, as shown in FIG. 5. An advantage of this arrangement is that it can reduce the overall weight and complexity of the catcher 255 by "piggybacking" the third cam track 254c on the existing structure of the first cam track 254a. In other embodiments, for example, when the system 200 does not include a hinge panel 215 (and accordingly does not include the first cam track 254a), the third cam track 254c can be carried directly by the wing pivot bracket 217 or a separate bracket.

Figure 6:
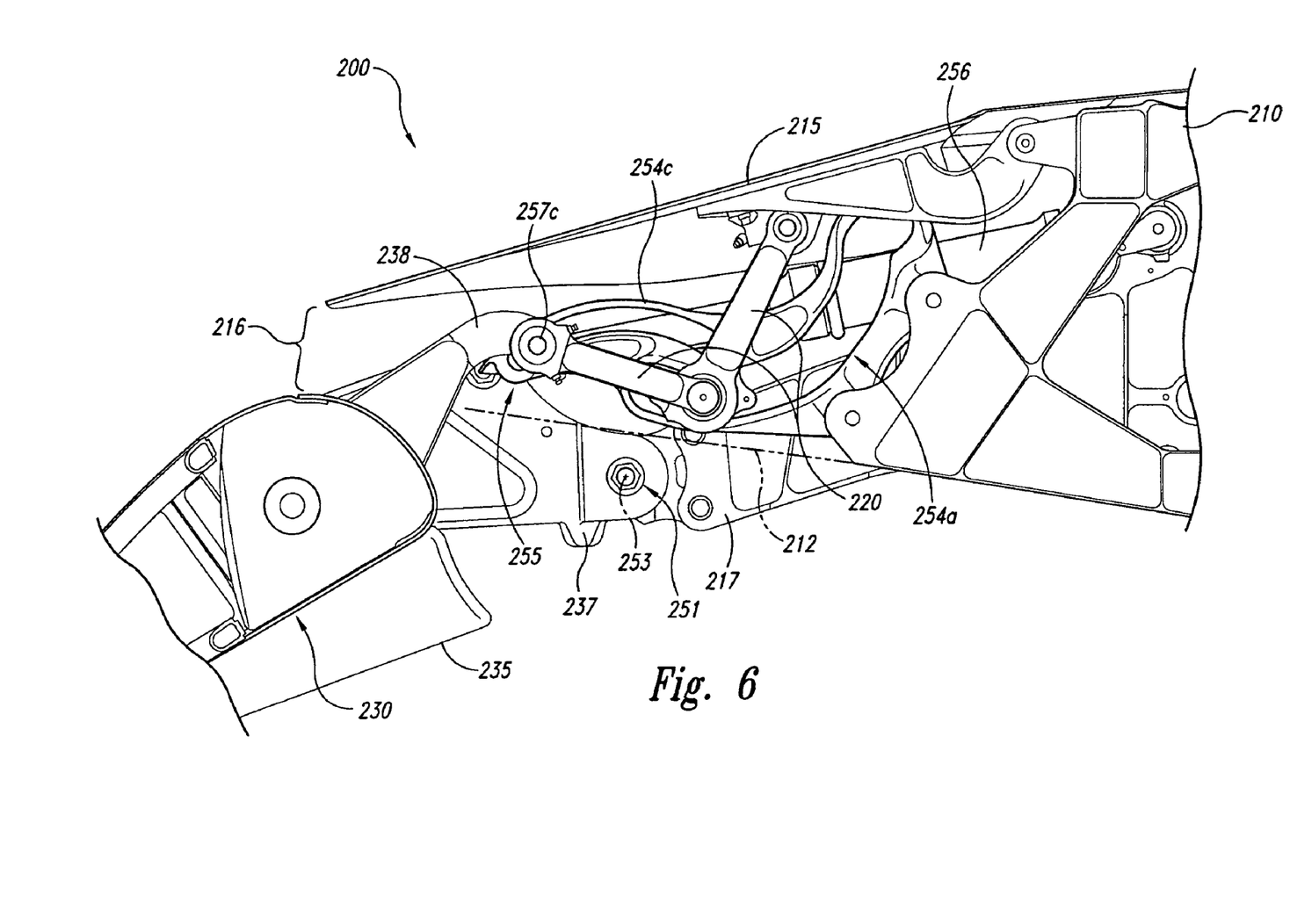
FIG. 6 is a partially schematic cross-sectional illustration of the arrangement shown in FIGS. 3 and 4, with the trailing edge device shown in a deployed position.

FIG. 6 illustrates the system 200 with the trailing edge device 230 in a representative deployed position that is within a range of deployed positions. In this position, the gap 216 between the wing 210 and the trailing edge device 230 is visible. As is also evident from FIG. 6, the hinge panel 215 has moved downwardly to control the size of the gap 216. This arrangement can be used to control both the lift and drag resulting from deploying the trailing edge device 230. As is also shown in FIG. 6, the third cam 257c remains in the third cam track 254c during deployment, so as to be captured in the event that other elements of the coupling (e.g., the wing pivot bracket 217, the device pivot bracket 237, or the pivot joint 251) provide a reduced level of support.

Figure 7:
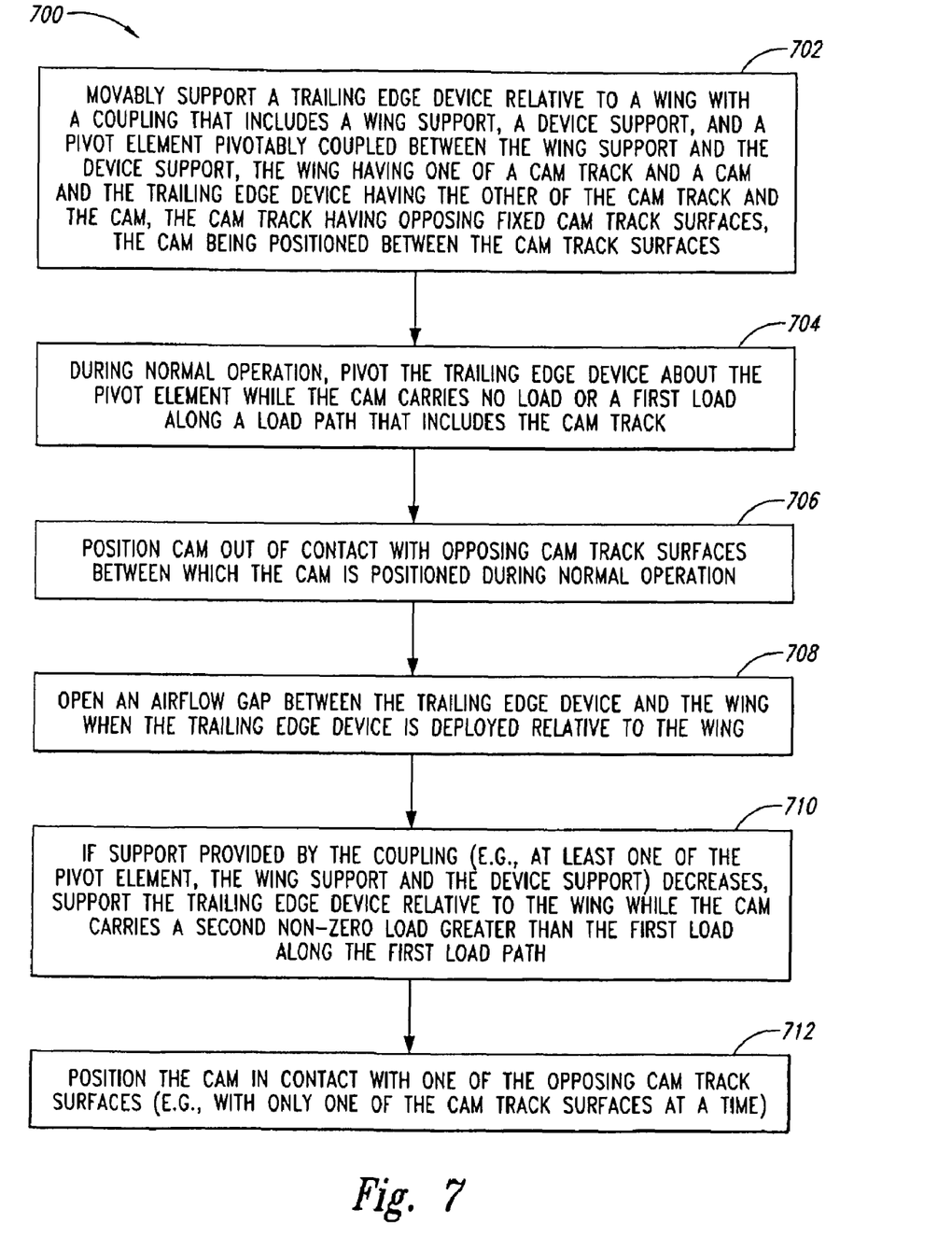
FIG. 7 is a block diagram illustrating a method in accordance with an embodiment of the disclosure.

FIG. 7 is a flow diagram illustrating a process 700 for operating an aircraft system. The process 700 can include movably supporting a trailing edge device relative to a wing with a coupling that includes a wing support, a device support, and a pivot element pivotally coupled between the wing support and the device support (process portion 702). The wing can have one of a cam track and a cam, and the trailing edge device can have the other of the cam track and the cam, with the cam having opposing fixed cam track surfaces and the cam being positioned between the cam track surfaces. Process portion 704 includes, during normal operation, pivoting the trailing edge device about the pivot element while the cam carries no load or a first load along a load path that includes the cam track. During normal operation, the cam can be positioned out of contact with opposing cam track surfaces between which the cam is positioned (process portion 706). As the trailing edge device is deployed relative to the wing, an air flow gap can open between the trailing edge device and the wing (process portion 708) in particular embodiments. In process portion 710, if support provided by the coupling (e.g., at least one of the pivot element, the wing support and the device support) decreases, the process can further include supporting the trailing edge device relative to the wing while the cam carries a second non-zero load greater than the first load along the load path. In a particular embodiment, the process 700 can include positioning the cam in contact with one of the opposing cam track surfaces (e.g., with only one of the cam track surfaces at a time) if support provided by the coupling decreases (process portion 712).

One aspect of at least some of the foregoing embodiments described above with reference to FIGS. 2A-7 is that they can include a cam track and corresponding cam that, during normal operation, carry no load or a relatively low load along a load path that includes the cam track but not the pivot element or other features of the pivot joint. If the support provided by at least one of the pivot element, the wing support, and the device support is reduced, the cam carries a second, non-zero load greater than the first load along the load path. Accordingly, the cam and cam track can provide a catcher function.

Another aspect of at least some of the foregoing embodiments is that the third cam track 254c is offset (e.g., radially outwardly and in a particular embodiment, upwardly) from the pivot joint 251. An advantage of this arrangement is that the third cam track 254c can be placed within (e.g., above the lower portion of) the composite external contour 219 of the wing 210, rather than outside the composite external contour 219. Accordingly, the fairing 235 that aerodynamically shields the pivot joint 251 need not be made larger to accommodate the catcher 255 provided by the third cam track 254c and the corresponding third cam 257c. This arrangement can reduce the impact of the catcher on overall system weight and drag.

Still another feature of at least some of the foregoing embodiments is that the catchers 255 can have a relatively low forward facing area. Accordingly, they can be installed on a trailing edge device 230 having a relatively short span, without unnecessarily interfering with airflow through the gap 216. In a particular arrangement, the third cam track 254c can be aligned in a streamwise manner with the first cam track 254a so that it provides little or no additional frontal area beyond that already provided by the existing first cam track 254a. In addition to allowing the structure carrying the third cam track 254c to be integrated with the structure carrying the first cam track 254a and thereby reduce the overall weight of these components, this arrangement can reduce or eliminate any additional blockage presented by the third cam track 254c in the gap 216, thereby allowing for more efficient aerodynamic operation of the trailing edge device 230 in its deployed position. Although the foregoing structures can be integrated as described above, the corresponding cam tracks themselves (e.g., the constant radius third cam track 254c and the more complexly curved first cam track 254a) are generally discontinuous from each other because each carries a different cam.

From the foregoing, it will be appreciated that specific embodiments of the disclosure have been described herein for purposes of illustration, but that various modifications may be made without deviating from the disclosure. For example, the various brackets, linkages, actuators and couplings can have arrangements different that those specifically illustrated in the Figures, while still including operationally similar catcher features. The foregoing arrangement can be applied to a flaperon, as shown generally in the Figures, and/or to other trailing edge devices, installed on aircraft of the general type shown in FIG. 2, or aircraft of other types. The catcher arrangement can include two pairs of cam tracks and cams (e.g., the third and fourth cam tracks 254c, 254d, and the third and fourth cams 257c, 257d), as shown in the Figures, or other numbers of paired cam tracks and cams. For example, a catcher arrangement in accordance with another embodiment can include a single cam track 254/cam 257 pair, e.g., located midway along the span of the trailing edge device 230. In other embodiments, the catcher arrangement 255 can include more than two cam track 254/cam 257 pairs. In still further embodiments, the relative positions of the cam track 254 and cam 257 can be reversed, e.g., the cam track 254 can be carried by the trailing edge device 230, and the cam 257 can be carried by the wing 210. In yet further embodiments, the pivot axis 253 can be located within the composite contour 219 of the wing 210/trailing edge device 230, while still providing an airflow gap 216 when the trailing edge device 230 is in the deployed position (FIG. 6).

Certain aspects of the disclosure described in the context of particular embodiments may be combined or eliminated in other embodiments. For example, the hinge panels described above can be eliminated in some embodiments, along with the associated cams and cam tracks. Further, while advantages associated with certain embodiments have been described in the context of those embodiments, other embodiments may also exhibit such advantages, and not all embodiments need necessarily exhibit such advantages to fall within the scope of the disclosure. Accordingly, the disclosure can include other embodiments not specifically described or shown above.

We claim:

1. An aircraft system, comprising:
   a wing having a wing support;
   a trailing edge device carried by and movable relative to the wing, the trailing edge device having a device support;
   a coupling connected between the wing and the trailing edge device, the coupling including:
   a pivot joint that includes a pivot element aligned along a pivot axis and connected between the wing support and the device support;
   an actuator coupled between the wing and the trailing edge device, the actuator having a first position in which the trailing edge device is stowed, and a second position in which the trailing edge device is deployed, with an airflow gap located between the wing and the trailing edge device when the trailing edge device is in the second position;
   a cam track carried by one of the wing and the trailing edge device and having opposing cam track surfaces fixed relative to each other; and
   a cam carried by the other of the wing and the trailing edge device and positioned within the cam track between the opposing cam track surfaces, the cam being offset from the pivot axis, wherein during normal operation the cam carries no load or a first load along a load path that includes the cam track, and wherein the cam carries a second non-zero load greater than the first load along the load path when a decrease in support provided by at least one of the pivot element, the wing support and the device support occurs.

2. The system of claim 1 wherein the cam is positioned to contact only one of the opposing cam track surfaces at a time.

3. The system of claim 1 wherein the motion of the trailing edge device relative to the wing is simple rotational motion about the pivot axis.

4. The system of claim 1 wherein the cam track is a third cam track, the cam is a third cam, and the system further comprises:
first and second generally parallel, laterally offset cam tracks carried by the wing;
first and second cams carried by the trailing edge device, each engaged with a corresponding one of the first and second cam tracks, the third cam track being discontinuous with both the first and second cam tracks;
a hinge panel carried by the wing and movable relative to the wing to control the size of the airflow gap; and
first and second hinge panel links coupled between the hinge panel and a corresponding one of the first and second cams.

5. The system of claim 4 wherein the first and third cam tracks are formed in a unitary cam track member.

6. The system of claim 4 wherein the first and third cam tracks are aligned with each other in a streamwise direction.

7. The system of claim 1 wherein the cam track forms a constant radius arc around the pivot point.

8. The system of claim 7 wherein the cam track forms less than a complete circular path.

9. The system of claim 1, further comprising a hinge panel carried by the wing and movable relative to the wing to control the size of the airflow gap.

10. The system of claim 1 wherein an outer surface of the wing and an outer surface of the trailing edge device together form a composite outer surface contour, and wherein the pivot axis is located external to the outer surface contour.

11. The system of claim 1 wherein the airflow gap changes size as the trailing edge device moves relative to the wing.

12. The system of claim 1 wherein the cam includes a roller.

13. The system of claim 1 wherein the cam includes a generally fixed, cylindrical-shaped element positioned to slide along the cam track surfaces.

14. The system of claim 1 wherein the cam is positioned out of contact with the cam track surfaces during normal operation, and wherein the load path does not include the pivot element.

15. The system of claim 1 wherein the cam track is carried by the wing and the cam is carried by the trailing edge device.

16. An aircraft system, comprising:
a wing having a wing external contour and a wing support;
a trailing edge device carried by and movable relative to the wing, the trailing edge device having a device support and a device external contour, the wing external contour and the device external contour together forming at least in part a composite contour;
a coupling connected between the wing and the trailing edge device, the coupling including:
a pivot joint that includes a pin aligned along a pivot axis and connected between the wing support and the device support, the pivot axis being located outside the composite contour;
an actuator coupled between the wing and the trailing edge device, the actuator having a first position in which the trailing edge device is stowed and a second position in which the trailing edge device is deployed, with an airflow gap located between the wing and the trailing edge device when the trailing edge device is in the deployed position;
first and second generally parallel, laterally offset cam tracks carried by the wing;
first and second cams carried by the trailing edge device, each engaged with a corresponding one of the first and second cam tracks;
a third cam track carried by the wing, the third cam track being offset from the pivot axis and being curved at a constant radius about the pivot axis; and
a third cam carried by the trailing edge device and positioned within the third cam track, the third cam being out of contact with the surfaces of the third cam track during normal operation, and being in contact with the third cam track when a decrease in support occurs for at least one of the pin, the wing bracket and the device bracket.

17. The system of claim 16 wherein the third cam track includes opposing fixed surfaces between which the third cam is positioned, and wherein the third cam contacts only one of the surfaces at a time.

18. The system of claim 16, further comprising a rigid panel coupled to the first and second cams with cam links, wherein motion of the rigid panel changes the size of the airflow gap as the trailing edge device is moved between the stowed and deployed positions.

19. The system of claim 16 wherein the first and third cam tracks are aligned with each other in a streamwise direction.

20. The system of claim 19 wherein the first and third cam tracks form a unitary structural element.

21. A method for operating an aircraft system, comprising:
movably supporting a trailing edge device relative to a wing with a coupling that includes a wing support, a device support, and a pivot element pivotably coupled between the wing support and the device support, the wing having one of a cam track and a cam and the trailing edge device having the other of the cam track and the cam, the cam track having opposing fixed cam track surfaces, the cam being positioned between the cam track surfaces;
during normal operation, pivoting the trailing edge device about the pivot element while the cam carries no load or a first load along a load path that includes the cam track; and
if support provided by the coupling decreases, supporting the trailing edge device relative to the wing while the cam carries a second non-zero load greater than the first load along the load path.

22. The method of claim 21, further comprising positioning the cam out of contact with opposing cam track surfaces between which the cam is positioned during normal operation, and positioning the cam in contact with one of the opposing cam track surfaces if support provided by the coupling decreases.

23. The method of claim 22 wherein positioning the cam in contact with one of the opposing cam track surfaces includes positioning the cam in contact with only one of the cam track surfaces at a time.

24. The method of claim 21 wherein pivoting the trailing edge device includes opening an airflow gap between the trailing edge device and the wing when the trailing edge device is deployed relative to the wing.

25. The method of claim 21 wherein a decrease in support provided by the coupling includes a decrease in support provided by at least one of the pivot element, the wing support and the device support.

26. An aircraft system, comprising:
a wing having a wing support;
a trailing edge device carried by and movable relative to the wing, the trailing edge device having a device support;
a coupling connected between the wing and the trailing edge device, the coupling including:

a pivot joint that includes a pivot element aligned along a pivot axis and connected between the wing support and the device support;

an actuator coupled between the wing and the trailing edge device, the actuator having a first position in which the trailing edge device is stowed, and a second position in which the trailing edge device is deployed; and a catcher that includes a first element carried by one of the wing and the trailing edge device and having a track, and a second element carried by the other of the wing and the trailing edge device and positioned at the track, the second element being offset from the pivot axis, wherein during normal operation the second element carries no load or a first load along a load path that includes the track, and wherein the second element carries a second non-zero load greater than the first load along the load path when a decrease in support provided by at least one of the pivot element, the wing support and the device support occurs.

* * * * *